(12) United States Patent
Tan

(10) Patent No.: US 9,584,009 B2
(45) Date of Patent: Feb. 28, 2017

(54) LINE CURRENT REFERENCE GENERATOR

(71) Applicant: Supertex, Inc., Sunnyvale, CA (US)

(72) Inventor: Marc Tan, Sunnyvale, CA (US)

(73) Assignee: Microchip Technology Inc., Chandler, AZ (US)

( * ) Notice: Subject to any disclaimer, the term of this patent is extended or adjusted under 35 U.S.C. 154(b) by 714 days.

(21) Appl. No.: 13/938,229

(22) Filed: Jul. 10, 2013

(65) Prior Publication Data

US 2015/0016166 A1   Jan. 15, 2015

(51) Int. Cl.
*H02M 1/42* (2007.01)
*H02M 1/00* (2006.01)

(52) U.S. Cl.
CPC .. *H02M 1/4225* (2013.01); *H02M 2001/0009* (2013.01); *Y02B 70/126* (2013.01)

(58) Field of Classification Search
CPC ....... H02M 1/4225; H02M 2001/0009; H02M 2001/0012; H02M 1/42
See application file for complete search history.

(56) References Cited

U.S. PATENT DOCUMENTS

| | | | | |
|---|---|---|---|---|
| 5,867,379 | A * | 2/1999 | Maksimovic | H02M 1/4225 323/222 |
| 7,667,987 | B2 * | 2/2010 | Huynh | H02M 3/33507 363/21.01 |
| 8,120,347 | B1 * | 2/2012 | Cao | H02M 1/4225 323/222 |
| 2006/0245219 | A1 * | 11/2006 | Li | G05F 1/565 363/89 |
| 2012/0087160 | A1 * | 4/2012 | Yang | H02M 1/4225 363/44 |

* cited by examiner

*Primary Examiner* — Jessica Han
(74) *Attorney, Agent, or Firm* — DLA Piper LLP (US)

(57) ABSTRACT

The invention generally relates to the field of power factor correction and specifically to generation of a reference waveform which is proportional to line voltage and is controllable in amplitude.

19 Claims, 5 Drawing Sheets

LINE CURRENT REFERENCE GENERATOR

TECHNICAL FIELD

The invention generally relates to the field of power factor correction and specifically to generation of a waveform which is proportional to a voltage waveform and which is controllable in amplitude.

BACKGROUND OF THE INVENTION

It is generally desirable to operate an AC electrical system at a high power factor for the efficient transfer of electrical power. Highest power factor is attained when line current and line voltage are proportional.

An electronic load on an AC electrical system, such as an offline switching power supply, may attain operation at high power factor through a variety of measures.

One such measure is the closed loop control of the line current waveform. The closed loop control regulates the line current waveform in accordance with a line current reference waveform, the line current reference waveform being proportional to the line voltage waveform. In addition, it is generally desirable that the line current reference waveform is controllable in amplitude for the control of power level.

In the practice of implementing a closed loop control of the line current waveform, a general simplification of circuitry is attained by processing the rectified versions of the line current waveform and the line voltage waveform. Accordingly, it is generally desired that the line current reference waveform is proportional to the rectified line voltage waveform. For the sake of brevity the mention of line voltage and line current in the following implicitly refers to the mention of their rectified versions, unless stated otherwise.

There is a general need to provide the line current reference waveform at lowest cost and size.

A simple and straightforward solution of the prior art provides the line current reference waveform in two steps, a first step whereby a signal proportional to line voltage is derived by means of a resistive voltage divider, and a second step whereby the signal is controlled in amplitude by means of an analog multiplier circuit.

Drawbacks of the conventional approach are the general expense of a high voltage resistive divider, and the general expense of an analog multiplier.

SUMMARY OF THE INVENTION

The invention provides an approach for generating the desired line current reference waveform which is based on gauging the current rise of an inductor, the current rise being proportional to the line voltage and being proportional to the gauging period.

The desired line current reference waveform is generated in two steps. In a first step, a sampled line current reference waveform is generated by sampling once per switching cycle the current rise of an inductor, the current rise being gauged during a period where the inductor is connected to the line voltage and being gauged over a gauging period dependent on an amplitude control signal. Accordingly, the sample rate of the sampled line current reference waveform is equal to the switching frequency and the line current reference waveform samples are proportional to the line voltage and are controllable in amplitude. In a second step a continuous line current reference waveform is constructed from the sampled line current reference waveform by means of a sample and hold circuit or by some other means of interpolation known in the art.

A closed loop control of line current waveform may be implemented as a sampled data system. In such a situation, the second step of converting the sampled waveform into a continuous waveform can obviously be omitted.

By the very nature of an inductor, the current rise, associated with the application of a voltage across an inductor over a given time period, is proportional to the voltage across the inductor and is proportional to the given time period. Accordingly, a sampled line current reference waveform, being proportional to the line voltage and being controllable in amplitude, is provided by sampling the current rise of an inductor over a gauging period, where the inductor is connected to the line voltage during the gauging period and where the gauging period is dependent on an amplitude control signal.

The approach is generally suited to power supply topologies where an inductor of the power supply is subjected to the line voltage during some period of the switching cycle. A number of common offline power supply topologies, such as the boost topology and the flyback topology, feature an inductor, or a coupled inductor, which is subjected to the line voltage for some period of the switching cycle.

An advantage of the approach is that the measurement of the inductor current, for purpose of gauging the inductor current rise, often can be provided with few or no additional means, and that an analog multiplier circuit is not required. Particularly advantageous are power supply control circuit implementations which include the measurement of switch current, the switch current measurement providing the measurement of inductor current at no extra cost.

The present invention is suited to both the discontinuous and the continuous mode of operation. According to the principles of the invention the only requirement is that an inductor of the switching power supply is subjected to the line voltage for a time period within the switching cycle, and that a measurement of inductor current can be made within the time period for purpose of gauging a current rise of the inductor over a gauging period.

Other aspects and advantages of the present invention will become apparent from the following detailed description, taken in combination with the accompanying drawings, illustrating by way of example the principles of the invention.

DETAILED DESCRIPTION OF THE PREFERRED EMBODIMENTS

Figure 1:
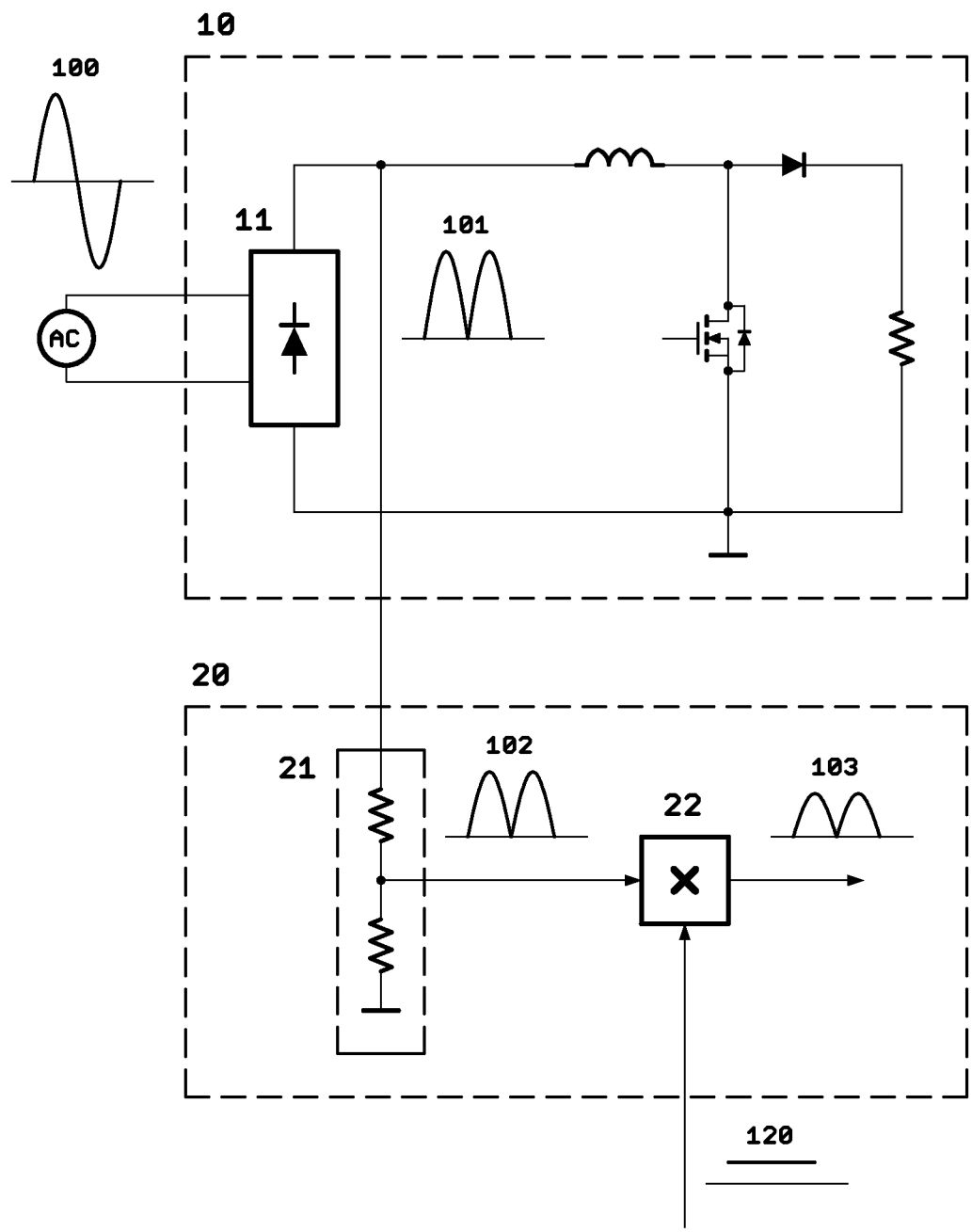
FIG. 1 shows a schematic diagram of a line current reference regulator of the prior art.

FIG. 1 shows an exemplary embodiment of a line current reference generator of the prior art in the setting of an offline boost regulator.

Line voltage waveform 100 is applied to the input of boost regulator 10. Bridge rectifier 11 converts line voltage waveform 100 into rectified line voltage waveform 101. Line current reference waveform 103 is established in a two step process. In a first step, line voltage waveform 101 is scaled down proportionally into intermediate reference waveform 102 by resistive voltage divider 21. In a second step, intermediate reference waveform 102 and amplitude control signal 120 are multiplied by analog multiplier 22, thus producing line current reference waveform 103.

Accordingly, the exemplary embodiment of FIG. 1 is capable of providing line current reference waveform 103, the waveform being proportional to line voltage waveform 101 and being controllable in amplitude by amplitude control signal 120. The exemplary embodiment of the prior art requires the expense of resistive voltage divider 21 and an analog multiplier 22.

Figure 2:
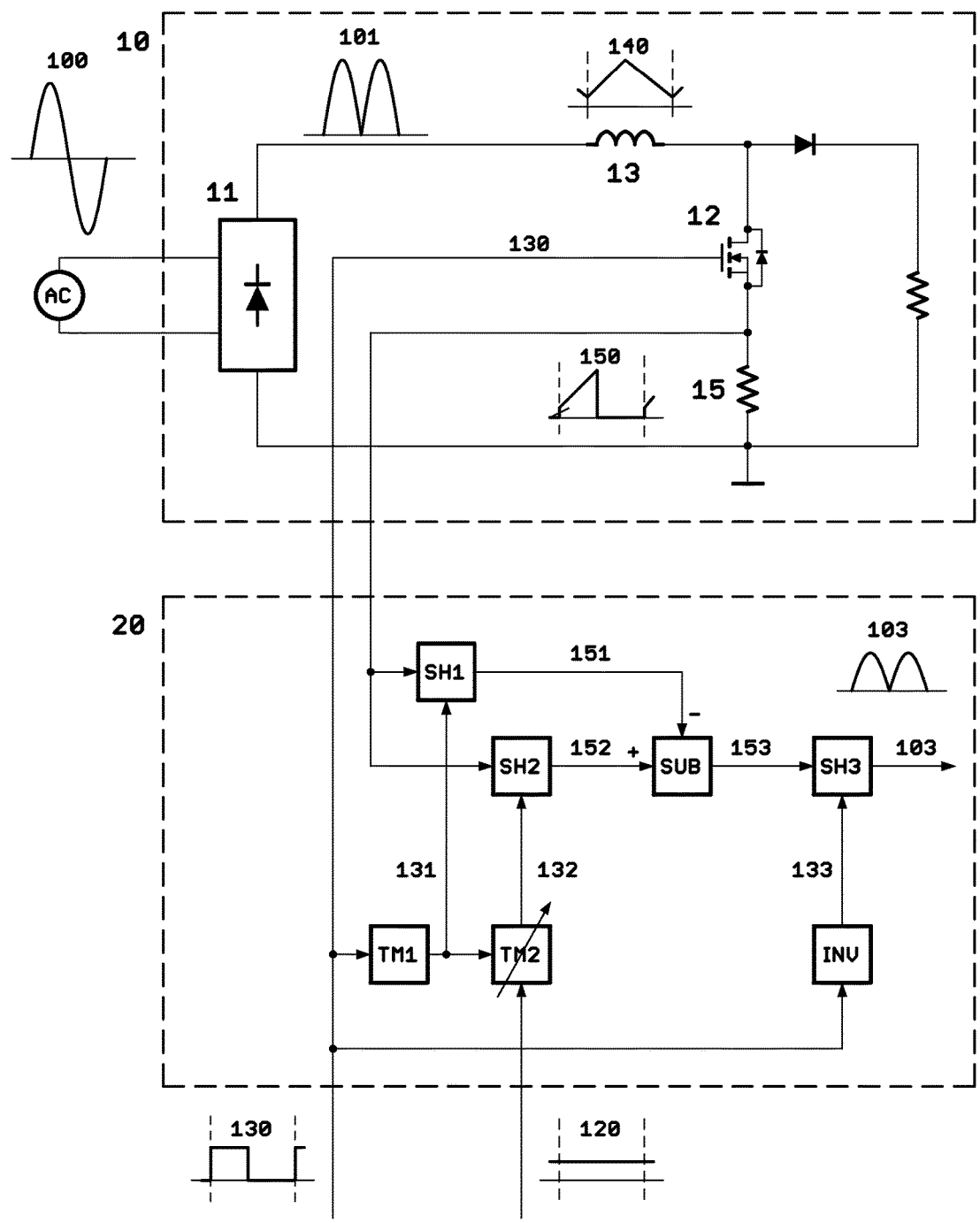
FIG. 2 shows a schematic diagram of an exemplary embodiment of the invention in the setting of a boost regulator.
Figure 3:
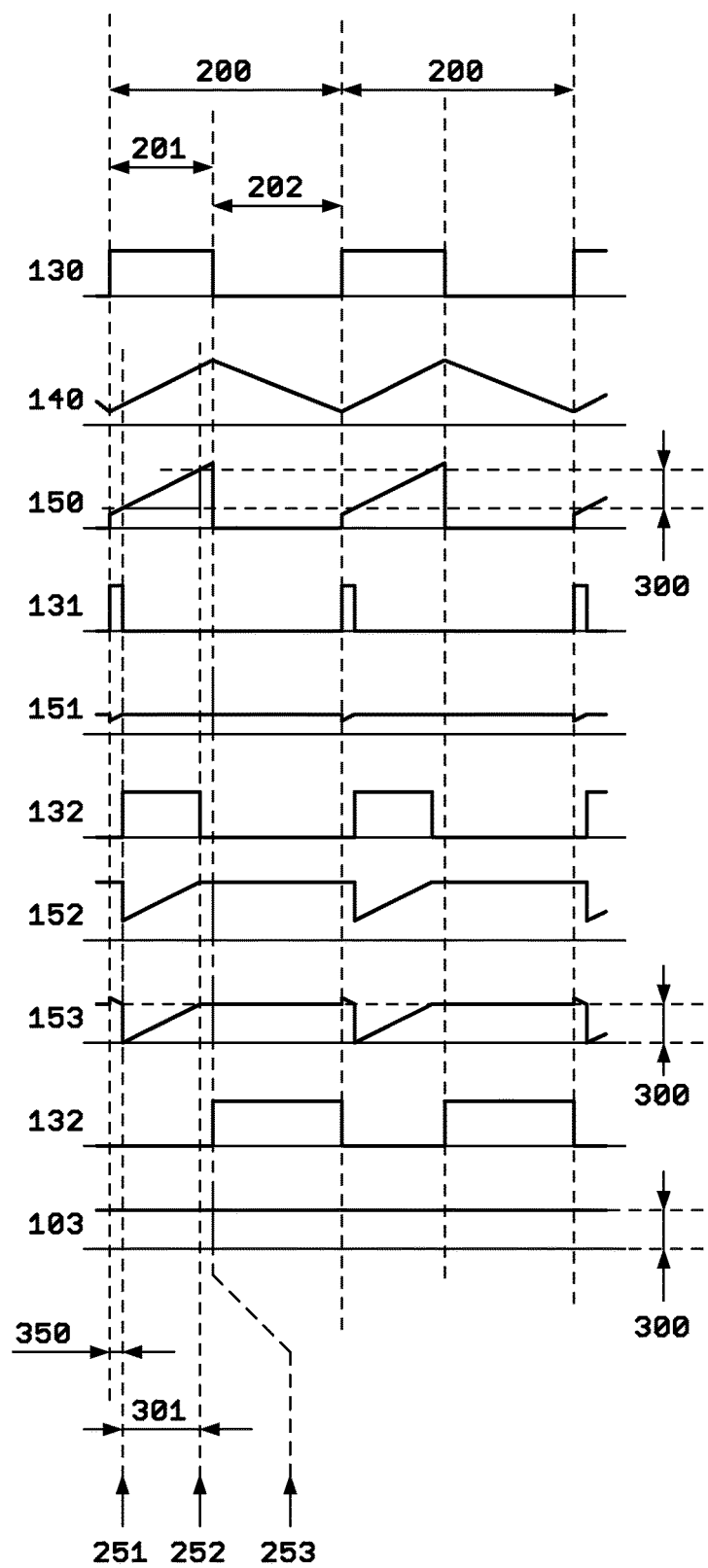
FIG. 3 shows a waveform diagram of an exemplary embodiment of the invention in the setting of a boost regulator.

FIG. 2 shows a schematic diagram and FIG. 3 shows a waveform diagram of an exemplary embodiment of a line current reference generator according to the current invention, again, in the setting of an offline boost regulator. Shown is an exemplary embodiment where the inductor current is measured by way of measuring the boost switch current. Furthermore, shown is an exemplary embodiment of a boost regulator operating in the continuous conduction mode. The circuitry is arranged primarily for highlighting the principles of operation and not necessarily for use of fewest resources.

Line current reference waveform 103, being proportional to line voltage 101 and being controllable in amplitude, is generated as follows.

Shown is FIG. 2 is offline boost regulator 10 which includes switch 12 being a switch of the FET type. Gate control signal 130 controls the state of switch 12 in typical fashion, closing and opening switch 12 once per switching cycle 200. Switch 12 is in the closed state during a leading part of switching cycle 200, the leading part generally known as on time period 201, and switch 12 is in the open state during a trailing part of switching cycle 200, the trailing part generally known as off time period 202.

Shown in FIG. 3 are waveforms covering two consecutive switching cycles 200, where the line voltage 101 and amplitude control signal 120 are, by way of example, assumed to be of constant magnitude, thus resulting in an identical inductor current rise 300 in both switching cycles and ultimately in a line current reference waveform 103 of constant amplitude.

Inductor 13 is subjected to line voltage 101 during on time period 201 causing inductor current 140 to rise. During on time period 201, inductor current 140 follows a path by way of switch 12 and current sense resistor 15. Accordingly, switch current measurement signal 150 as provided by current sense resistor 15 may serve as an inductor current sense signal for purpose of gauging inductor current rise 300 over gauging period 301 during on time period 201.

Continuous time reference waveform 103 is produced with the aid of three sample and hold circuits, SH1, SH2, SH3 and subtractor circuit SUB. Sample and hold circuit SH1 establishes the value of switch current 150 at the start of gauging period 301 by way of signal 151 at time instant 251. Sample and hold circuit SH2 establishes the value of switch current 150 at the end of gauging period 301 by way of signal 152 at time instant 252. Subtractor circuit SUB establishes sampled reference waveform 153 comprising the magnitude of inductor current rise 300 by subtracting the starting value as provided by signal 151 from the ending value as provided by signal 152. Sample and hold circuit SH3 facilitates the conversion of sampled reference waveform 153 into continuous reference waveform 103 at time instant 253. One of ordinary skill in the art will understand that sample and hold circuit SH3 is optional and need not be used if a sampled reference waveform, such as sampled reference waveform 153, is desired instead of a continuous reference waveform 103.

The gauging operation is controlled by the timers TM1, TM2 and inverter INV.

Timer TM1 operates sample and hold circuit SH1 by way of control signal 131 and establishes starting value 151 of inductor current rise 300 at time instant 251. Pulse period 350 of timer TM1 may be selected so as to locate the start of gauging period 301 in a part of on time period 201 where switching artifacts arising from the closing of switch 12 have subsided.

Timer TM2 operates sample and hold circuit SH2 by way of control signal 132 and establishes ending value 152 of inductor current rise 300 at time instant 252. The pulse period 301 of timer TM2 establishes the gauging period and is determined by amplitude control signal 120. Timer TM2 defines the relationship between gauging period 301 and amplitude control signal 120. The relationship may be proportional or otherwise. A proportional relationship provides a line current amplitude control characteristic which is identical to the one of analog multiplier 22 of the prior art circuit in FIG. 1.

Inverter INV operates sample and hold circuit SH3 by way of control signal 133, converting sampled reference waveform 153 into continuous reference waveform 103 at time instant 253. Time instant 253 corresponds with the start of off time period 202 by virtue of the use of inverter INV, but may be arranged for any other instant after time instant 252 and before time instant 251 of the directly following switching cycle using some other timer or logic arrangement.

Accordingly, the exemplary embodiment of FIG. 2 and FIG. 3 is capable of providing continuous line current reference waveform 103 which is proportional to the line voltage waveform 101 and which is controllable in amplitude by amplitude control signal 120.

One skilled in the art may devise many variations in defining a circuit for accomplishing the task of sampling a starting and an ending value of an inductor current rise over a gauging period, defining a starting location for the gauging period, defining circuitry for measuring the inductor current within the path of current flow, making adaptations specifically for either the discontinuous or the continuous conduction mode, defining circuitry for converting a sampled waveform into a continuous waveform, and choosing a suitable relationship between the amplitude control signal and the gauging period.

Figure 4:
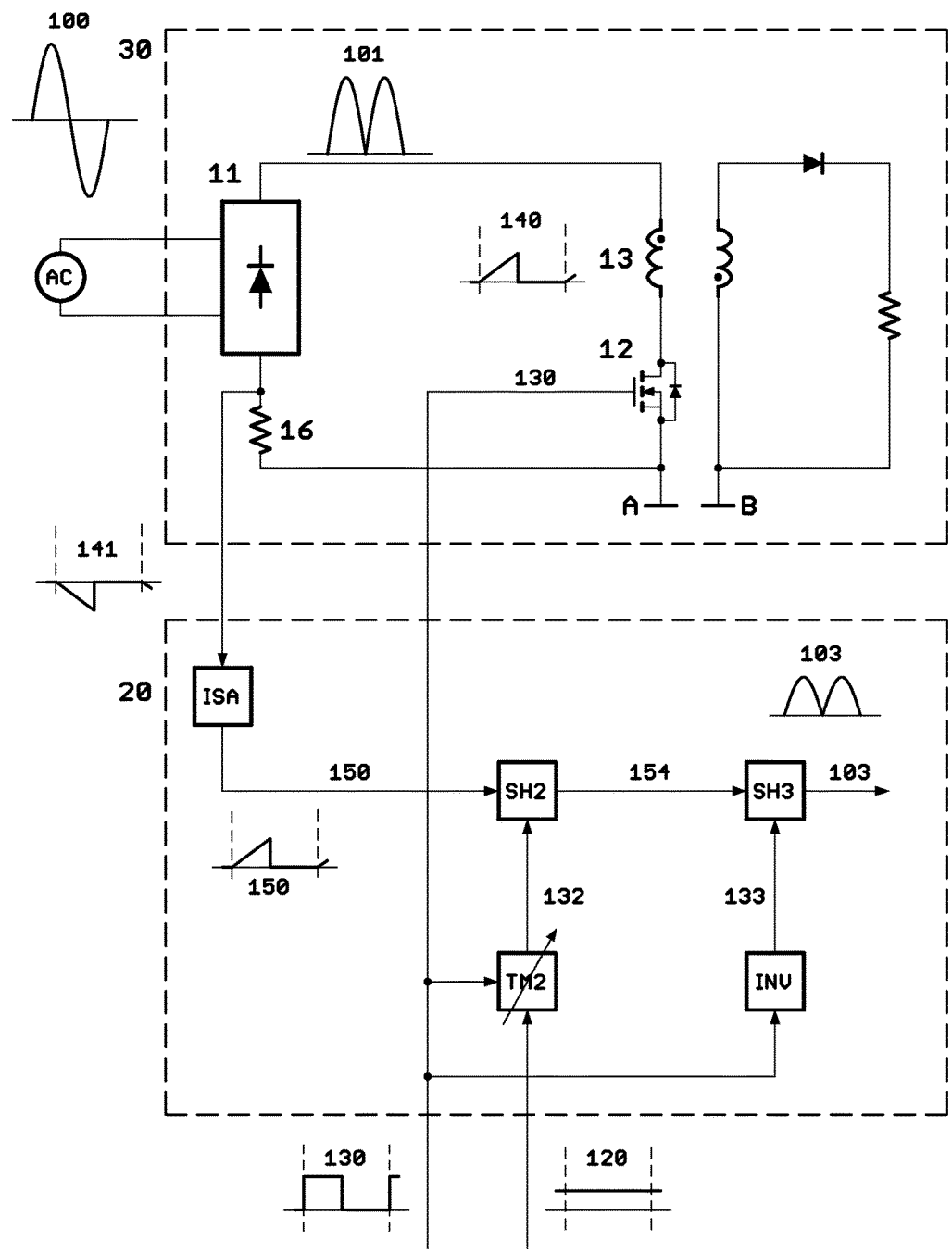
FIG. 4 shows a schematic diagram of an exemplary embodiment of the invention in the setting of a flyback regulator.
Figure 5:
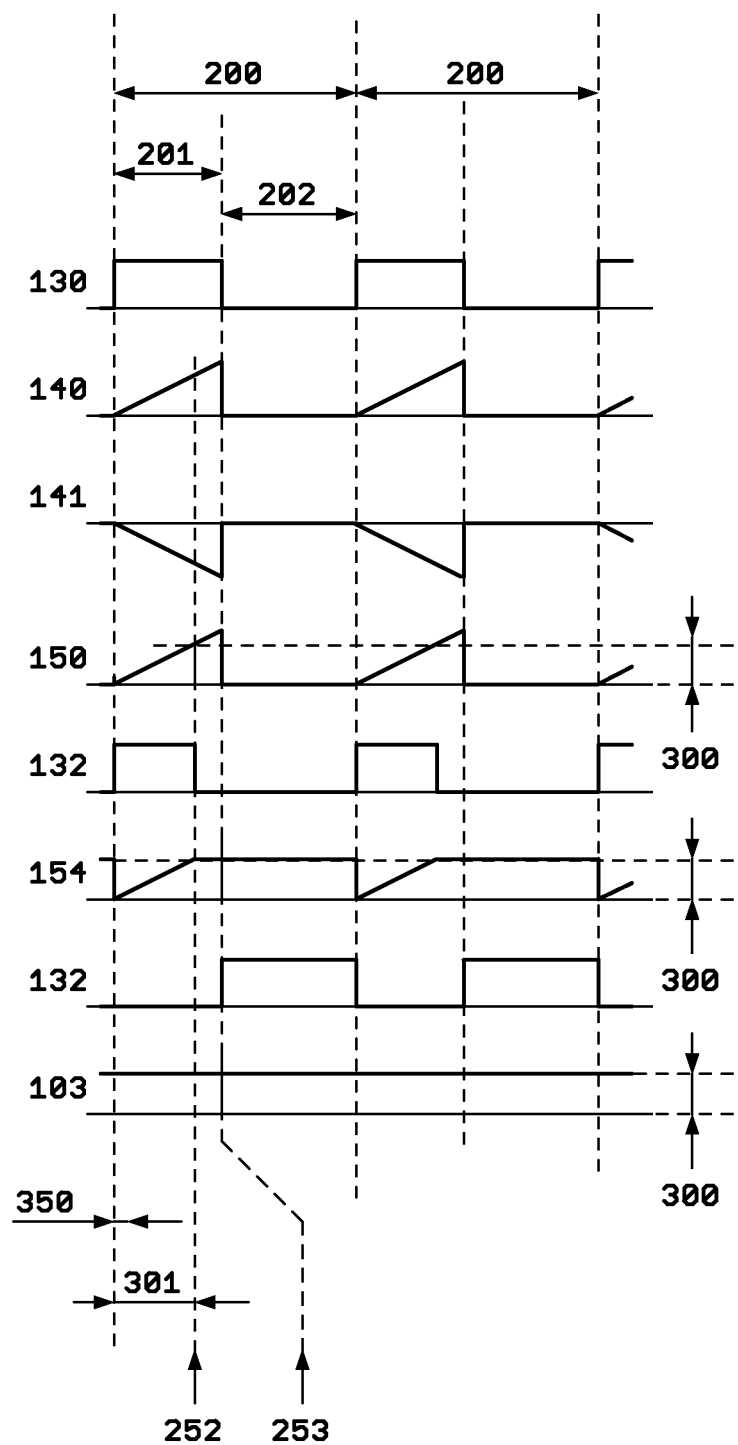
FIG. 5 shows a waveform diagram of an exemplary embodiment of the invention in the setting of a flyback regulator

FIG. 4 shows a schematic diagram and FIG. 5 shows a waveform diagram of an exemplary embodiment of a line current reference generator in the setting of an offline flyback regulator. Shown is an exemplary embodiment where the inductor current is measured by way of a sense resistor in series with the bridge rectifier. Furthermore, shown is an exemplary embodiment where the switching regulator operates in the discontinuous mode of operation.

Shown is FIG. 4 is offline flyback regulator 30 which includes switch 12 and inductor 13. Operational similarities of flyback regulator 30 and boost regulator 10 and their respective line current reference waveform generators 20 are not repeated here for the sake of brevity. Items, labeled with the same numbers shown in FIG. 4 and FIG. 5, perform the same function described previously for FIG. 2 and FIG. 3.

Inductor current 140 is measured in an alternative location with the help of current sense resistor 16, the location being the return path of bridge rectifier 11. Sense resistor 16 provides an inductor current measurement signal 141 with inverted sense. Inverting sense amplifier ISA is provided to invert the sense of measurement signal 141, thus providing an inductor current measurement signal 150 with the same sense as in FIG. 2 and FIG. 3.

Flyback regulator 30 is shown to operate in the discontinuous mode. Discontinuous mode operation permits simplification of the line current reference waveform generation circuitry. Shown is a simplified circuit where sample and hold circuit SH1, timer circuit TM1 and subtractor circuit SUB are not present. Operational differences with the exemplary embodiment of FIG. 2 and FIG. 3 are as follows.

Discontinuous mode operation is characterized in that inductor current 140 is zero or substantially near zero at the start of the switching cycle 200. Through locating the start of gauging period 301 at the start of switching cycle 200 the need for sampling and subtracting the starting value of inductor rise 300 is rendered unnecessary since the starting value is inherently zero or substantially near zero. Timer circuit TM2 provides sample and hold control signal 132 to sample and hold SH2 as before, thus providing ending value of the inductor current rise 300 as sampled reference waveform 154 at time instant 252. Inverter INV operates sample and hold circuit SH3 by way of control signal 133, converting sampled reference waveform 154 into continuous reference waveform 103 at time instant 253 as before.

Accordingly, the exemplary embodiment of FIG. 4 and FIG. 5 is capable of providing line current reference waveform 103 which is proportional to the line voltage waveform 101 and which is controllable in amplitude by amplitude control signal 120.

Although the embodiments described above involved a boost regulator or flyback regulator, one of ordinary skill in the art will understand that the invention applies to many types of regulators which include an inductor that is connected to the line voltage for some period of time in each switching cycle.

References to the present invention herein are not intended to limit the scope of any claim or claim term, but instead merely make reference to one or more features that may be covered by one or more of the claims. Materials and processes described above are exemplary only, and should not be deemed to limit the claims.

What is claimed is:

1. A line current waveform generator device for use with a switching regulator, comprising:
   a timing circuit for generating a first signal indicating the start of a gauging period and a second signal indicating the end of the gauging period; and
   a circuit for receiving the first signal, the second signal, and a third signal from an inductor in the switching regulator and for generating an output signal indicating the magnitude of current rise of the inductor over the gauging period.

2. The device of claim 1, wherein the gauging period is controllable in duration by altering the timing of the second signal.

3. The device of claim 1, wherein the output signal is a continuous waveform.

4. A device for generating a line current reference waveform, comprising:
   a rectifying circuit for receiving and rectifying a line voltage;
   an inductor coupled to the rectifying circuit, wherein a rise in current through the inductor is proportional to the line voltage;
   a timing circuit for generating a first signal indicating the start of a gauging period and a second signal indicating the end of the gauging period; and
   a current waveform generation circuit for receiving the first signal, the second signal, and a third signal from the inductor and for generating an output signal indicating the magnitude of current rise of the inductor over the gauging period.

5. The device of claim 4, wherein the current waveform generator circuit comprises a first sample and hold circuit for sampling the current through the inductor in response to the first signal.

6. The device of claim 5, wherein the current waveform generator circuit comprises a second sample and hold circuit for sampling the current through the inductor in response to the second signal.

7. The device of claim 6, wherein the current waveform generator circuit comprises a subtractor circuit for subtracting an output of the first sample and hold circuit from an output of the second sample and hold circuit.

8. The device of claim 7, wherein the current waveform generator circuit comprises a third sample and hold circuit for sampling the output of the subtractor circuit.

9. The device of claim 5, wherein the inductor is coupled to a current sense resistor.

10. The device of claim 9, wherein the waveform generator comprises an inverting sense amplifier coupled to the current sense resistor.

11. The device of claim 10, wherein the waveform generator comprises a first sample and hold circuit for sampling the output of the inverting sense amplifier.

12. The device of claim 11, wherein the waveform generator comprises a second sample and hold circuit for sampling the output of the first sample and hold circuit.

13. The device of claim 12, wherein the first sample and hold circuit is controlled by a first timer and the second sample and hold circuit is controlled by a control signal.

14. The device of claim 13, wherein the waveform generator comprises a transistor coupled between the inductor and current sense resistor.

15. The device of claim 4, wherein a transistor is coupled between the inductor and the current waveform generator circuit.

16. A method of generating a line current reference waveform, comprising:
   rectifying, by a rectifier, alternating current (AC) from a line voltage;
   turning on a switch within a switching regulator;
   generating, by an inductor within the switching regulator, a rise in current, wherein the rise is proportional to the line voltage;
   generating, by a timing circuit, a first signal indicating the start of a gauging period and a second signal indicating the end of the gauging period;
   generating, by a waveform generator, a line current reference waveform indicating the magnitude of the rise in current of the inductor over the gauging period.

17. A method of generating a line current reference waveform associated with a switching regulator, comprising:
   generating, by a timing circuit, a first signal indicating the start of a gauging period and a second signal indicating the end of the gauging period;

generating, by a waveform generator coupled to an inductor in a switching regulator, a line current reference waveform indicating the magnitude of a rise in current of the inductor over the gauging period.

18. The method of claim 17, further comprising:
setting the gauging period by setting the timing of the second signal.

19. The method of claim 17, wherein line current reference waveform is a continuous waveform.

\* \* \* \* \*